US012756594B2

(12) United States Patent
Zong et al.

(10) Patent No.: US 12,756,594 B2
(45) Date of Patent: Oct. 6, 2026

(54) METHOD AND ELECTRONIC DEVICE FOR DATA TRANSMISSION ACROSS MULTIPLE CLOUDS, AND COMPUTER-READABLE STORAGE MEDIUM

(71) Applicant: Cloud Intelligence Assets Holding (Singapore) Private Limited, Singapore (SG)

(72) Inventors: Zhigang Zong, Hangzhou (CN); Xiaomin Wu, Hangzhou (CN); Xiyun Xu, Hangzhou (CN); Daxiang Kang, Hangzhou (CN)

(73) Assignee: Cloud Intelligence Assets Holding (Singapore) Private Limited, Singapore (SG)

( * ) Notice: Subject to any disclaimer, the term of this patent is extended or adjusted under 35 U.S.C. 154(b) by 162 days.

(21) Appl. No.: 18/687,879

(22) PCT Filed: Aug. 15, 2022

(86) PCT No.: PCT/CN2022/112579

§ 371 (c)(1),
(2) Date: Feb. 29, 2024

(87) PCT Pub. No.: WO2023/029974

PCT Pub. Date: Mar. 9, 2023

(65) Prior Publication Data

US 2024/0380638 A1 Nov. 14, 2024

(30) Foreign Application Priority Data

Aug. 31, 2021 (CN) ......................... 202111014518.7

(51) Int. Cl.
*G06F 15/16* (2006.01)
*H04L 12/46* (2006.01)
*H04L 61/09* (2022.01)

(52) U.S. Cl.
CPC .......... *H04L 12/4641* (2013.01); *H04L 61/09* (2022.05)

(58) Field of Classification Search
CPC . H04L 12/4641; H04L 61/09; H04L 41/0677; H04L 41/0803; H04L 41/34; H04L 67/10
See application file for complete search history.

(56) References Cited

U.S. PATENT DOCUMENTS 10,244,076 B2 * 3/2019 Sivasankaran ........ H04L 45/745
10,447,498 B2 * 10/2019 De Luca ................ H04L 45/76
(Continued)

FOREIGN PATENT DOCUMENTS

CN 105991735 A 10/2016
CN 109787938 A 5/2019
(Continued)

OTHER PUBLICATIONS

International Search Report dated Oct. 18, 2022, for International Application No. PCT/CN2022/112579.
(Continued)

*Primary Examiner* — Razu A Miah
(74) *Attorney, Agent, or Firm* — Osha Bergman Watanabe & Burton LLP

(57) ABSTRACT

The present application provides a method and an electronic device for data transmission across multiple clouds, and a computer-readable storage medium. The method includes: receiving, by a multi-cloud gateway of a local cloud, a cloud service request, and sending the cloud service request to a multi-cloud gateway of a remote cloud to enable the multi-cloud gateway of the remote cloud to send the cloud service request to a target cloud service configured on the remote cloud via a mapping VPC according to an address of a local cloud VPC and an address of the target cloud service, and to send target data returned by the target cloud service to the
(Continued)

multi-cloud gateway of the local cloud according to pre-stored routing information of the mapping VPC. In this way, the data transmission between multiple clouds is realized by means of the configuration of the multi-cloud gateways and the mapping VPC.

15 Claims, 8 Drawing Sheets

(56) References Cited

U.S. PATENT DOCUMENTS

| | | | | |
|---|---|---|---|---|
| 10,491,466 | B1 * | 11/2019 | Hira | H04L 41/0803 |
| 12,160,408 | B2 * | 12/2024 | Mayya | H04L 12/66 |
| 12,316,540 | B1 * | 5/2025 | Delecroix | H04L 45/64 |
| 2015/0163213 | A1 | 6/2015 | Chen | |
| 2016/0248625 | A1 * | 8/2016 | Lee | H04L 12/4641 |
| 2016/0277497 | A1 * | 9/2016 | Bannister | H04L 67/1097 |
| 2018/0063235 | A1 * | 3/2018 | Beveridge | H04L 67/1021 |
| 2018/0365104 | A1 * | 12/2018 | Huang | H03M 13/373 |
| 2019/0014038 | A1 * | 1/2019 | Ritchie | H04L 12/4675 |
| 2019/0068500 | A1 * | 2/2019 | Hira | H04L 49/354 |
| 2019/0104053 | A1 * | 4/2019 | Cidon | H04L 12/4641 |
| 2020/0169474 | A1 | 5/2020 | Nagarkar et al. | |
| 2020/0177489 | A1 * | 6/2020 | Zeng | H04L 45/033 |
| 2020/0366528 | A1 * | 11/2020 | Ritchie | H04L 45/04 |
| 2023/0308421 | A1 * | 9/2023 | Mayya | H04L 49/35 |
| 2023/0336473 | A1 * | 10/2023 | Trujillo | H04L 45/586 |

FOREIGN PATENT DOCUMENTS

| | | | |
|---|---|---|---|
| CN | 110311932 | A | 10/2019 |
| CN | 110636115 | A | 12/2019 |
| CN | 111225071 | A | 6/2020 |
| CN | 111385203 | A | 7/2020 |
| CN | 111614541 | A | 9/2020 |
| CN | 113316919 | A | 8/2021 |
| CN | 113472598 | A | 10/2021 |
| WO | 2021139269 | A1 | 7/2021 |

OTHER PUBLICATIONS

Huang Yanbo et al. “The Evolution of Hybrid Cloud Architecture and Technology” Published in 2019.

Zhao Hongzhi et al. “Virtual Private Cloud (VPC) Desig of Gansu Radio and Television Ali Cloud Platform” Published in 2016.

CN Notice of Allowance dated Nov. 10, 2021 in connection with Application Serial No. 202111014518.7.

CN Office Action dated Oct. 18, 2021 in connection with Application Serial No. 202111014518.7.

* cited by examiner

METHOD AND ELECTRONIC DEVICE FOR DATA TRANSMISSION ACROSS MULTIPLE CLOUDS, AND COMPUTER-READABLE STORAGE MEDIUM

CROSS-REFERENCE TO RELATED APPLICATIONS

The present application is a National Stage of International Application No. PCT/CN2022/112579, filed on Aug. 15, 2022, which claims priority to Chinese Patent Application No. 202111014518.7, entitled "CLOUD SERVICE METHOD, ELECTRONIC DEVICE AND COMPUTER-READABLE STORAGE MEDIUM" and filed with the China National Intellectual Property Administration on Aug. 31, 2021. These applications are hereby incorporated by reference in their entireties.

TECHNICAL FIELD

Embodiments of the present disclosure relate to the field of cloud computing technologies and, in particular, to a cloud service method, an electronic device and a computer-readable storage medium.

BACKGROUND

With the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

SUMMARY

Embodiments of the present disclosure provide a cloud service method, an electronic device and a computer-readable storage medium.

In a first aspect, an embodiment of the present disclosure provides a cloud service method, applicable to a local cloud configured with a multi-cloud gateway.

Specifically, the cloud service method includes:

receiving, by the multi-cloud gateway of the local cloud, a cloud service request, where the cloud service request carries a request source address, a request ontology, an address of a target cloud service, and an address of a local cloud virtual private cloud (VPC);

sending, by the multi-cloud gateway of the local cloud, the cloud service request to a multi-cloud gateway of a remote cloud according to pre-stored routing information of the target cloud service corresponding to the address of the target cloud service, to enable the multi-cloud gateway of the remote cloud to send the cloud service request to the target cloud service configured on the remote cloud via a mapping VPC according to the address of the local cloud VPC and the address of the target cloud service, and to send target data returned by the target cloud service to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC;

receiving, by the multi-cloud gateway of the local cloud, the target data sent by the multi-cloud gateway of the remote cloud, and sending the target data to the request source address.

In combination with the first aspect, in a first implementation of the first aspect, the local cloud is further configured with a multi-cloud controller, and the method further includes:

requesting, by the multi-cloud controller of the local cloud, a multi-cloud controller of the remote cloud to perform multi-cloud control registration.

In combination with the first aspect and the first implementation of the first aspect, in a second implementation of the first aspect, the requesting, by the multi-cloud controller of the local cloud, the multi-cloud controller of the remote cloud to perform multi-cloud control registration includes:

in response to receiving a multi-cloud control registration request sent by the local cloud VPC, sending, by the multi-cloud controller of the local cloud, the multi-cloud control registration request to the multi-cloud controller of the remote cloud, to enable the multi-cloud controller of the remote cloud to create the mapping VPC of the local cloud VPC according to the multi-cloud control registration request, and to store the routing information of the mapping VPC into the multi-cloud gateway of the remote cloud, where the multi-cloud control registration request carries the address of the local cloud VPC and routing information of the local cloud VPC;

receiving, by the multi-cloud controller of the local cloud, multi-cloud control registration success information returned by the multi-cloud controller of the remote cloud.

In a second aspect, an embodiment of the present disclosure provides a cloud service method, applicable to a remote cloud configured with a multi-cloud gateway.

Specifically, the cloud service method includes:

receiving, by the multi-cloud gateway of the remote cloud, a cloud service request sent by a multi-cloud gateway of a local cloud, where the cloud service request carries a request source address, a request ontology, an address of a target cloud service, and an address of a local cloud VPC;

sending, by the multi-cloud gateway of the remote cloud, the cloud service request to the target cloud service configured on the remote cloud via a mapping VPC according to the address of the local cloud VPC and the address of the target cloud service, to enable the target cloud service to, after confirming a service authority according to the address of the local cloud VPC, obtain target data according to the request ontology and send the target data to the multi-cloud gateway of the remote cloud via the mapping VPC;

receiving, by the multi-cloud gateway of the remote cloud, the target data sent by the target cloud service, and sending the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

In combination with the second aspect, in a first implementation of the second aspect, the remote cloud is further configured with a multi-cloud controller, and the method further includes:

performing, by the multi-cloud controller of the remote cloud, multi-cloud control registration according to a request from a multi-cloud controller of the local cloud.

In combination with the second aspect and the first implementation of the second aspect, in a second implementation of the second aspect, the performing, by the multi-cloud controller of the remote cloud, multi-cloud control registration according to the request from the multi-cloud controller of the local cloud includes:

in response to receiving a multi-cloud control registration request sent by the multi-cloud controller of the local cloud, creating, by the multi-cloud controller of the remote cloud, the mapping VPC of the local cloud VPC according to the multi-cloud control registration request, and storing the address and the routing information of the mapping VPC into the multi-cloud gateway of the remote cloud, where the multi-cloud control registration request carries the address of the local cloud VPC and routing information of the local cloud VPC;

sending, by the multi-cloud controller of the remote cloud, multi-cloud control registration success information to the multi-cloud controller of the local cloud.

In a third aspect, an embodiment of the present disclosure provides a cloud service method, applicable to a cloud system including a local cloud and a remote cloud.

Specifically, the cloud service method includes:

receiving, by a multi-cloud gateway of the local cloud, a cloud service request, where the cloud service request carries a request source address, a request ontology, an address of a target cloud service, and an address of a local cloud VPC;

sending, by the multi-cloud gateway of the local cloud, the cloud service request to a multi-cloud gateway of the remote cloud according to pre-stored routing information of the target cloud service corresponding to the address of the target cloud service;

sending, by the multi-cloud gateway of the remote cloud, the cloud service request to the target cloud service configured on the remote cloud via a mapping VPC according to the address of the local cloud VPC and the address of the target cloud service that are carried in the cloud service request, to enable the target cloud service to, after confirming a service authority according to the address of the local cloud VPC, obtain target data according to the request ontology and send the target data to the multi-cloud gateway of the remote cloud via the mapping VPC;

sending, by the multi-cloud gateway of the remote cloud, the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC;

sending, by the multi-cloud gateway of the local cloud, the target data to the request source address.

In combination with the third aspect, in a first implementation of the third aspect, the local cloud is configured with a multi-cloud controller of the local cloud, the remote cloud is configured with a multi-cloud controller of the remote cloud, and the method further includes:

in response to receiving a multi-cloud control registration request sent by the local cloud VPC, sending, by the multi-cloud controller of the local cloud, the multi-cloud control registration request to the multi-cloud controller of the remote cloud, where the multi-cloud control registration request carries the address of the local cloud VPC and routing information of the local cloud VPC;

creating, by the multi-cloud controller of the remote cloud, the mapping VPC of the local cloud VPC according to the multi-cloud control registration request, storing the address and the routing information of the mapping VPC into the multi-cloud gateway of the remote cloud, and sending multi-cloud control registration success information to the multi-cloud controller of the local cloud;

receiving, by the multi-cloud controller of the local cloud, the multi-cloud control registration success information returned by the multi-cloud controller of the remote cloud.

In a fourth aspect, an embodiment of the present disclosure provides a cloud service method.

Specifically, the cloud service method includes:

displaying cloud service optional information on a user interaction interface, where the cloud service optional information includes one or more pieces of cloud service identification information;

in response to triggering by a user on a piece of the cloud service identification information on the user interaction interface, generating and sending a cloud service request of the user to a local cloud, where the cloud service request of the user carries a request source address, a request ontology and an address of a target cloud service;

in response to receiving target data returned by the local cloud, displaying the target data on the user interaction interface.

In a fifth aspect, an embodiment of the present disclosure provide a multi-cloud gateway, applicable to a local cloud.

Specifically, the multi-cloud gateway is configured to:

receive a cloud service request, where the cloud service request carries a request source address, a request ontology, an address of a target cloud service, and an address of a local cloud VPC;

send the cloud service request to a multi-cloud gateway of a remote cloud according to pre-stored routing information of the target cloud service corresponding to the address of the target cloud service, to enable the multi-cloud gateway of the remote cloud to send the cloud service request to the target cloud service configured on the remote cloud via a mapping VPC according to the address of the local cloud VPC and the address of the target cloud service, and to send target data returned by the target cloud service to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC;

receive the target data sent by the multi-cloud gateway of the remote cloud, and send the target data to the request source address.

In a sixth aspect, an embodiment of the present disclosure provide a multi-cloud gateway, applicable to a remote cloud.

Specifically, the multi-cloud gateway is configured to:

receive a cloud service request sent by a multi-cloud gateway of a local cloud, where the cloud service request carries a request source address, a request ontology, an address of a target cloud service, and an address of a local cloud VPC;

send the cloud service request to the target cloud service configured on the remote cloud via a mapping VPC according to the address of the local cloud VPC and the address of the target cloud service, to enable the target cloud service to, after confirming a service authority according to the address of the local cloud VPC, obtain target data according to the request ontology and send the target data to the multi-cloud gateway of the remote cloud via the mapping VPC;

receive the target data sent by the target cloud service, and send the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

In a seventh aspect, an embodiment of the present disclosure provides an electronic device including a memory and a processor, where the memory is configured to store one or more computer instructions supporting a cloud service apparatus to execute the above cloud service method, and the processor is configured to execute the computer instructions stored in the memory. The cloud service apparatus can further include a communication interface, which is configured for the cloud service apparatus to communicate with other devices or communication networks.

In an eighth aspect, an embodiment of the present disclosure provides a computer-readable storage medium for storing computer instructions used by a cloud service apparatus, which include computer instructions for executing the above cloud service method by the cloud service apparatus.

In a ninth aspect, an embodiment of the present disclosure provides a computer program product including computer instructions, where the method steps of the above cloud service method are implemented when the computer instructions are executed by a processor.

The technical solutions provided by the embodiments of the present disclosure can include the beneficial effects as follows.

The technical solutions realize data transmission between multiple clouds by means of the configuration of the multi-cloud gateways and the mapping VPC. The technical solutions realize multi-cloud interoperability of service products. Although the service products are deployed and operated on multiple independent clouds, for a user, it is like operating one cloud. Therefore, the technical solutions greatly simplify the network management procedure of cloud services, and they not only are simple to operate and lower in cost, but also can ensure data security.

It should be understood that the general description mentioned above and the following detailed description are only exemplary and explanatory, and should not be deemed to be limitations on the embodiments of the present disclosure.

BRIEF DESCRIPTION OF DRAWINGS

Other features, objects and advantages of embodiments of the present disclosure will become more apparent by the following detailed description of non-limiting implementations in conjunction with the accompanying drawings, in which.

DESCRIPTION OF EMBODIMENTS

Figure 1:
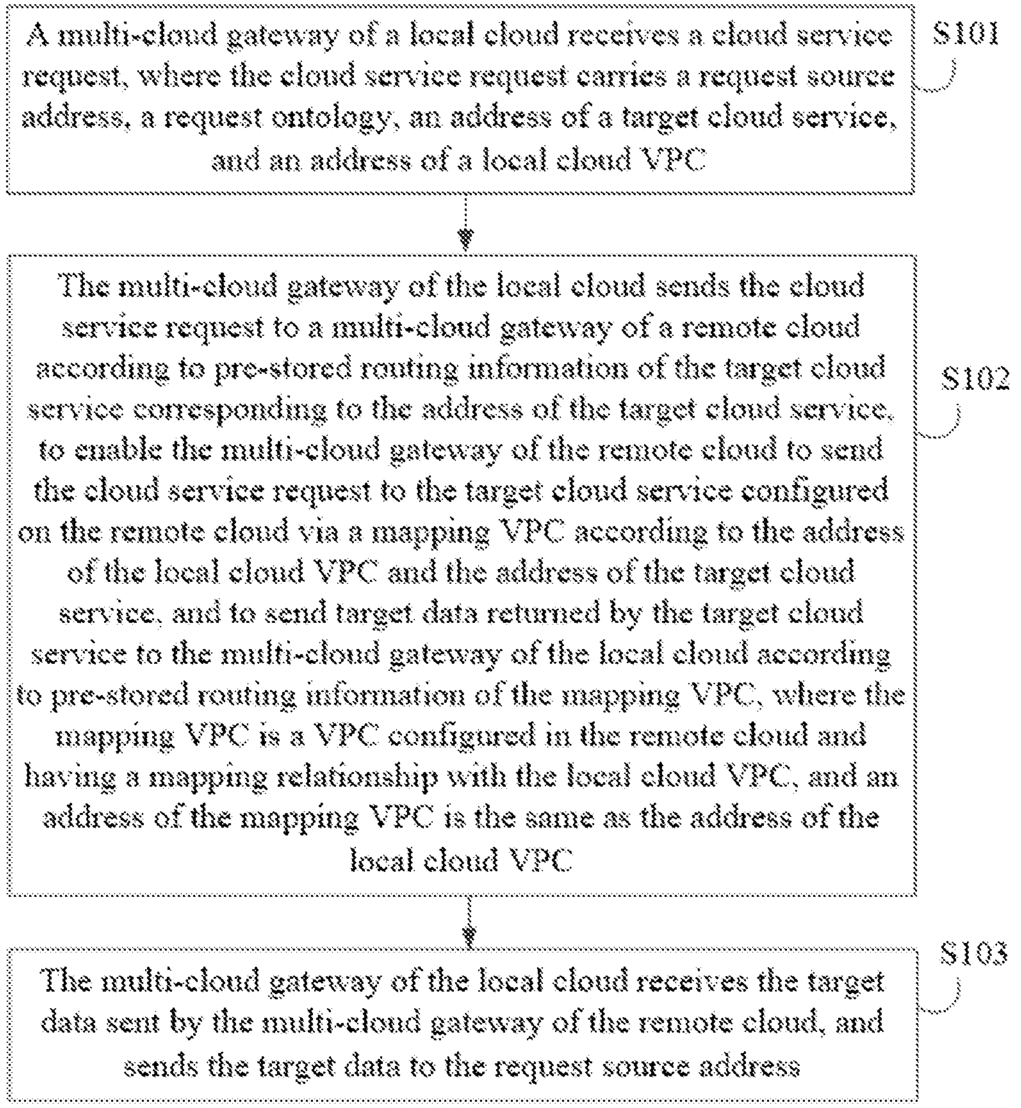
FIG. 1 shows a flowchart of a cloud service method according to an implementation of the present disclosure.

Hereinafter, exemplary implementations of embodiments of the present disclosure will be described in detail with reference to the accompanying drawings so that those skilled in the art can easily implement them. Furthermore, for the sake of clarity, parts irrelevant to describing the exemplary implementations are omitted in the drawings.

In the embodiments of the present disclosure, it should be understood that terms such as "comprising", "having" or the like are intended to indicate the presence of features, numbers, steps, actions, components, portions or combinations thereof disclosed in this specification, and are not intended to exclude the possibility that one or more other features, numbers, steps, actions, components, portions or combinations thereof exist or are added.

In addition, it should be noted that the embodiments of the present disclosure and features in the embodiments can be combined with each other as long as there is no conflict among them. The embodiments of the present disclosure will be described in detail below with reference to the drawings and embodiments.

The technical solutions provided by the embodiments of the present disclosure realize data transmission between multiple clouds by means of the configuration of multi-cloud gateways and a mapping VPC. The technical solutions realize multi-cloud interoperability of service products. Although the service products are deployed and operated on multiple independent clouds, for a user, it is like operating one cloud. Therefore, the technical solutions greatly simplify the network management procedure of cloud services, and they not only are simple to operate and lower in cost, but also can ensure data security.

FIG. 1 shows a flowchart of a cloud service method according to an implementation of the present disclosure. As shown in FIG. 1, the cloud service method includes the following steps S101 to S103.

In step S101, a multi-cloud gateway of a local cloud receives a cloud service request, where the cloud service request carries a request source address, a request ontology, an address of a target cloud service, and an address of a local cloud VPC.

In step S102, the multi-cloud gateway of the local cloud sends the cloud service request to a multi-cloud gateway of a remote cloud according to pre-stored routing information of the target cloud service corresponding to the address of the target cloud service, to enable the multi-cloud gateway of the remote cloud to send the cloud service request to the target cloud service configured on the remote cloud via a mapping VPC according to the address of the local cloud VPC and the address of the target cloud service, and to send target data returned by the target cloud service to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

In step S103, the multi-cloud gateway of the local cloud receives the target data sent by the multi-cloud gateway of the remote cloud, and sends the target data to the request source address.

As mentioned above, with the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

Considering the above problems, in this implementation, a cloud service method is proposed, which realizes data transmission between multiple clouds by means of the configuration of the multi-cloud gateways and the mapping VPC. The technical solution realizes multi-cloud interoperability of service products. Although the service products are deployed and operated on multiple independent clouds, for a user, it is like operating one cloud. Therefore, the technical solution greatly simplifies the network management procedure of cloud services, and it not only is simple to operate and lower in cost, but also can ensure data security.

In an implementation of the present disclosure, the cloud service method is applicable to a local cloud that is configured with a multi-cloud gateway and can perform cloud service processing.

In an implementation of the present disclosure, the local cloud refers to a certain user's proprietary cloud that provides cloud services only for this user.

In an implementation of the present disclosure, the remote cloud refers to a cloud that is different from a proprietary cloud providing cloud services only for a certain user and is not exclusive to the user, and that can provide cloud services for multiple users or belongs to other users. The remote cloud may be, for example, a public cloud, other proprietary clouds, etc. That is to say, the cloud service method can be implemented in the same type of clouds or in different types of clouds.

In an implementation of the present disclosure, the multi-cloud gateway of the local cloud refers to a gateway component configured on the local cloud for realizing multi-cloud data transmission and providing a data transmission channel for multi-cloud services. In order to realize data transmission between the local cloud and the remote cloud, the multi-cloud gateway of the local cloud is configured with the routing information of the target cloud service that the user desires to request. In this way, the multi-cloud gateway of the local cloud can forward the request for the target cloud service to a server of the target cloud service according to the pre-stored routing information of the target cloud service when receiving the request for the target cloud service.

In an implementation of the present disclosure, the cloud service request refers to a request that desires to request a cloud service configured in the remote cloud, and the cloud service request can carry the following information: the request source address, the request ontology, the address of the target cloud service, and the address of the local cloud VPC. The request source address refers to an address of a user who requests the cloud service, that is, an address at which data of the cloud service is received after the data of the cloud service is obtained. The request ontology is used to characterize a specific content of the cloud service request, such as requesting to obtain some data, requesting to obtain some services, etc. The address of the target cloud service refers to an address of a cloud server that provides the user with the data he/she desires. The cloud service is configured in the remote cloud, and the cloud service configured in the remote cloud may belong to the same service provider or different service providers. The address of the local cloud VPC refers to an address of a VPC configured on the local cloud.

In the implementations mentioned above, after receiving the cloud service request carrying the request source address, the request ontology, the address of the target cloud service and the address of the local cloud VPC, the multi-cloud gateway of the local cloud determines the pre-stored routing information of the target cloud service corresponding to the address of the target cloud service, and then sends the cloud service request to the multi-cloud gateway of the remote cloud according to the determined routing information of the target cloud service, so as to enable the multi-cloud gateway of the remote cloud to send the cloud service request to the target cloud service configured on the remote cloud via the mapping VPC according to the address of the local cloud VPC and the address of the target cloud service, and to send the target data returned by the target cloud service to the multi-cloud gateway of the local cloud according to the routing information of the mapping VPC pre-stored by the multi-cloud gateway of the remote cloud, where the mapping VPC is a VPC configured in the remote cloud and having a mapping relationship with the local cloud VPC. The mapping VPC is only a virtual configuration of the local cloud VPC, and it only has the same address as the address of the local cloud VPC, but does not have computing resources of the local cloud VPC. The configuration of the mapping VPC is used to realize data intercommunication between the multi-cloud gateway of the local cloud and the multi-cloud gateway of the remote cloud. Finally, after receiving the target data returned by the multi-cloud gateway of the remote cloud, the multi-cloud gateway of the local cloud can send the target data to the request source address to realize the multi-cloud service provided for the user.

In an implementation of the present disclosure, the local cloud is further configured with a multi-cloud controller, and the method further includes:

the multi-cloud controller of the local cloud requests a multi-cloud controller of the remote cloud to perform multi-cloud control registration.

In order to establish a data connection channel between the local cloud and the remote cloud, the local cloud is further configured with the multi-cloud controller to realize multi-cloud control registration of the remote cloud. After the multi-cloud control registration is successful, the inter-cloud data transmission described above can be achieved.

In an implementation of the present disclosure, the step of the multi-cloud controller of the local cloud requesting the multi-cloud controller of the remote cloud to perform multi-cloud control registration can further include the following steps:

in response to receiving a multi-cloud control registration request sent by the local cloud VPC, the multi-cloud controller of the local cloud sends the multi-cloud control registration request to the multi-cloud controller of the remote cloud, to enable the multi-cloud controller of the remote cloud to create the mapping VPC of the local cloud VPC according to the multi-cloud control registration request, and to store the routing information of the mapping VPC into the multi-cloud gateway of the remote cloud, where the multi-cloud control registration request carries the address of the local cloud VPC and routing information of the local cloud VPC;

the multi-cloud controller of the local cloud receives multi-cloud control registration success information returned by the multi-cloud controller of the remote cloud.

When performing the multi-cloud control registration, the local cloud VPC can send the multi-cloud control registration request to the multi-cloud controller of the local cloud through a VPC controller of the local cloud, where the multi-cloud control registration request carries the address of the local cloud VPC and the routing information of the local cloud VPC. After receiving the multi-cloud control registration request, the multi-cloud controller of the local cloud sends the multi-cloud control registration request to the multi-cloud controller of the remote cloud, so as to enable the multi-cloud controller of the remote cloud to create the mapping VPC of the local cloud VPC through a VPC controller of a public cloud according to the address of the local cloud VPC carried in the multi-cloud control registration request, and to store the routing information of the local cloud VPC into the multi-cloud gateway of the remote cloud as the routing information of the mapping VPC. After receiving the multi-cloud control registration success information returned by the multi-cloud controller of the remote cloud, the multi-cloud controller of the local cloud can deem that the multi-cloud control registration is successful, that is, the data connection channel between the local cloud and remote cloud has been established successfully, and the inter-cloud data transmission mentioned above can be realized by means of the data connection channel between the local cloud and the remote cloud subsequently.

Figure 2:
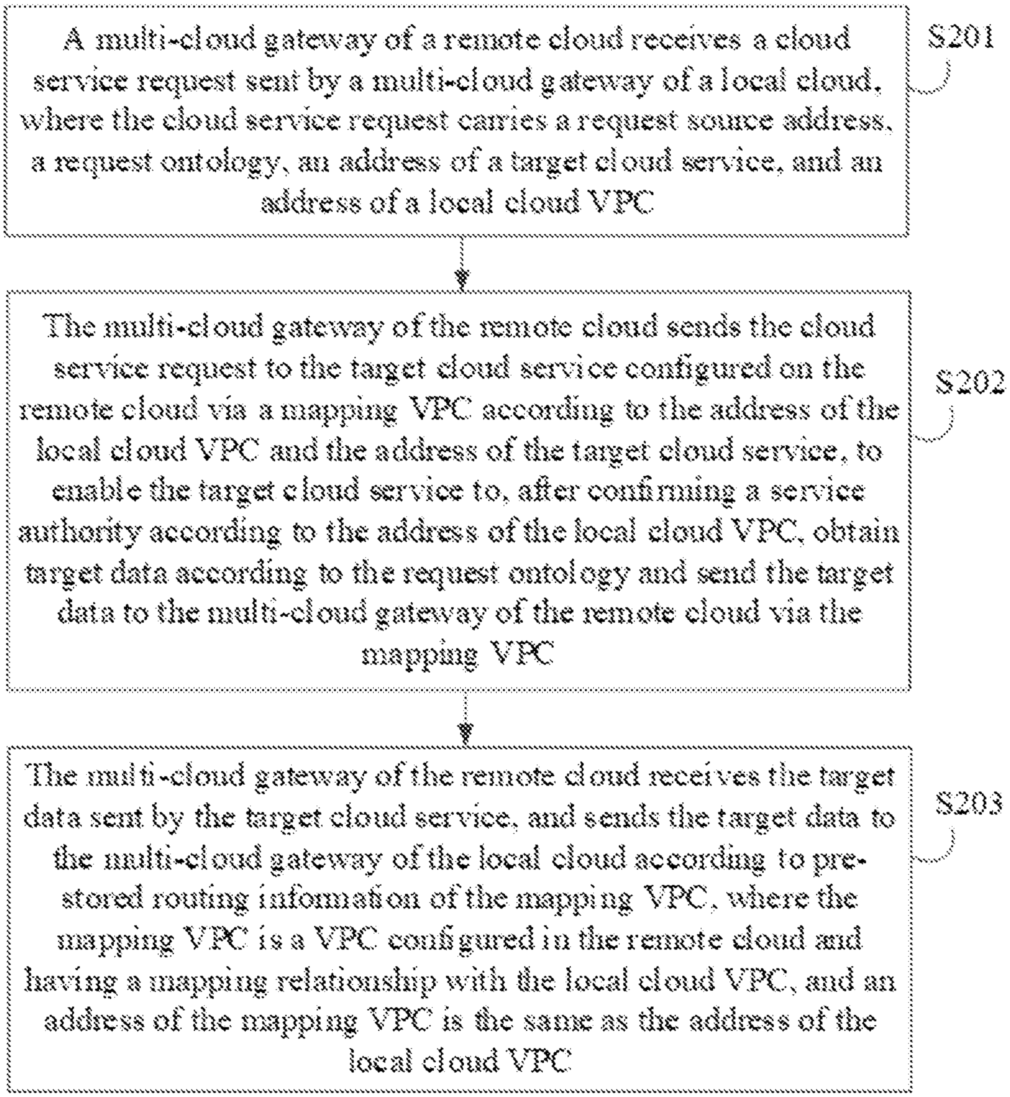
FIG. 2 shows a flowchart of a cloud service method according to another implementation of the present disclosure.

FIG. 2 shows a flowchart of a cloud service method according to another implementation of the present disclosure. As shown in FIG. 2, the cloud service method includes the following steps S201 to S203.

In step S201, a multi-cloud gateway of a remote cloud receives a cloud service request sent by a multi-cloud gateway of a local cloud, where the cloud service request carries a request source address, a request ontology, an address of a target cloud service, and an address of a local cloud VPC.

In step S202, the multi-cloud gateway of the remote cloud sends the cloud service request to the target cloud service configured on the remote cloud via a mapping VPC according to the address of the local cloud VPC and the address of the target cloud service, to enable the target cloud service to, after confirming a service authority according to the address of the local cloud VPC, obtain target data according to the request ontology and send the target data to the multi-cloud gateway of the remote cloud via the mapping VPC.

In step S203, the multi-cloud gateway of the remote cloud receives the target data sent by the target cloud service, and send the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

As mentioned above, with the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

Considering the above problems, in this implementation, a cloud service method is proposed, which realizes data transmission between multiple clouds by means of the configuration of the multi-cloud gateways and the mapping VPC. The technical solution realizes multi-cloud interoperability of service products. Although the service products are deployed and operated on multiple independent clouds, for a user, it is like operating one cloud. Therefore, the technical solution greatly simplifies the network management procedure of cloud services, and it not only is simple to operate and lower in cost, but also can ensure data security.

In an implementation of the present disclosure, the cloud service method is applicable to a remote cloud that is configured with a multi-cloud gateway and can perform cloud service processing.

In an implementation of the present disclosure, the multi-cloud gateway of the remote cloud refers to a gateway component configured on the remote cloud for realizing multi-cloud data transmission and providing a data transmission channel for multi-cloud services. In order to realize data transmission between the remote cloud and a user's local cloud, the multi-cloud gateway of the remote cloud is configured with the address and routing information of the mapping VPC of the local cloud VPC. In this way, after receiving the target data sent by the target cloud service, the multi-cloud gateway of the remote cloud can forward the target data to the multi-cloud gateway of the local cloud corresponding to the routing information of the mapping VPC according to the pre-stored address and routing information of the mapping VPC.

In the implementations mentioned above, after receiving the cloud service request that carries the request source address, the request ontology, the address of the target cloud service and the address of the local cloud VPC and that is sent by the multi-cloud gateway of the local cloud, the multi-cloud gateway of the remote cloud forwards the cloud service request to the target cloud service configured on the remote cloud via the mapping VPC according to the address of the local cloud VPC and the address of the target cloud service in the cloud service request, so as to enable the target cloud service to, after confirming the service authority of the user according to the address of the local cloud VPC, obtain the target data that the user desires to request according to the request ontology and send the target data to the multi-cloud gateway of the remote cloud via the mapping VPC. If the user has the authority to use the target cloud service, the address of the local cloud VPC of the user is stored in the target cloud service; if the user does not have the authority to use the target cloud service, the address of the local cloud VPC of the user is not stored in the target cloud service. Therefore, the target cloud service can confirm whether the user has the authority to use the cloud service by confirming whether it stores the address of the local cloud VPC carried in the cloud service request. After receiving the target data sent by the target cloud service, the multi-cloud gateway of the remote cloud can send the target data to the multi-cloud gateway of the local cloud corresponding to the routing information of the mapping VPC according to the pre-stored routing information of the mapping VPC whose address is the same as the address of the local cloud VPC.

In an implementation of the present disclosure, the remote cloud is further configured with a multi-cloud controller, and the method further includes:

the multi-cloud controller of the remote cloud performs multi-cloud control registration according to a request from a multi-cloud controller of the local cloud.

In order to establish a data connection channel between the remote cloud and the local cloud, the remote cloud is also configured with the multi-cloud controller to implement multi-cloud control registration for the local cloud. After the multi-cloud control registration is successful, the inter-cloud data transmission described above can be achieved.

In an implementation of the present disclosure, the step of the multi-cloud controller of the remote cloud performing multi-cloud control registration according to the request from the multi-cloud controller of the local cloud can further include the following steps:

in response to receiving a multi-cloud control registration request sent by the multi-cloud controller of the local cloud, the multi-cloud controller of the remote cloud creates the mapping VPC of the local cloud VPC according to the multi-cloud control registration request, and stores the address and the routing information of the mapping VPC into the multi-cloud gateway of the remote cloud, where the multi-cloud control registration request carries the address of the local cloud VPC and routing information of the local cloud VPC;

the multi-cloud controller of the remote cloud sends multi-cloud control registration success information to the multi-cloud controller of the local cloud.

When performing multi-cloud control registration for the local cloud, after receiving the multi-cloud control registration request that carries the address of the local cloud VPC and the routing information of the local cloud VPC and that is sent by the multi-cloud controller of the local cloud, the multi-cloud controller of the remote cloud creates the mapping VPC of the local cloud VPC through a VPC controller of the remote cloud according to the address of the local cloud VPC carried in the multi-cloud control registration request, and stores the address of the local cloud VPC and the routing information of the local cloud VPC into the multi-cloud gateway of the remote cloud as the address of the mapping VPC and the routing information of the mapping VPC. In this way, the multi-cloud gateway of the remote cloud can subsequently confirm the routing information of the mapping VPC based on the address of the mapping VPC, and send the received data to the multi-cloud gateway of the local cloud corresponding to the local cloud VPC according to the routing information of the mapping VPC. Then the multi-cloud control registration success information can be sent to the multi-cloud controller of the local cloud to confirm that the multi-cloud control registration is successful, that is, to confirm that the data connection channel between the remote cloud and the local cloud is established successfully, and then the inter-cloud data transmission described above can be realized by means of the data connection channel between the remote cloud and the local cloud.

The technical terminologies and technical features shown in FIG. 2 and involved in related implementations are identical or similar to the technical terminologies and technical features shown in FIG. 1 and mentioned in related implementations, and the explanations and illustrations of the technical terminologies and technical features shown in FIG. 2 and involved in related implementations can be found in the explanations and illustrations for those shown in FIG. 1 and mentioned in related implementations, which will not be repeated here.

Figure 3:
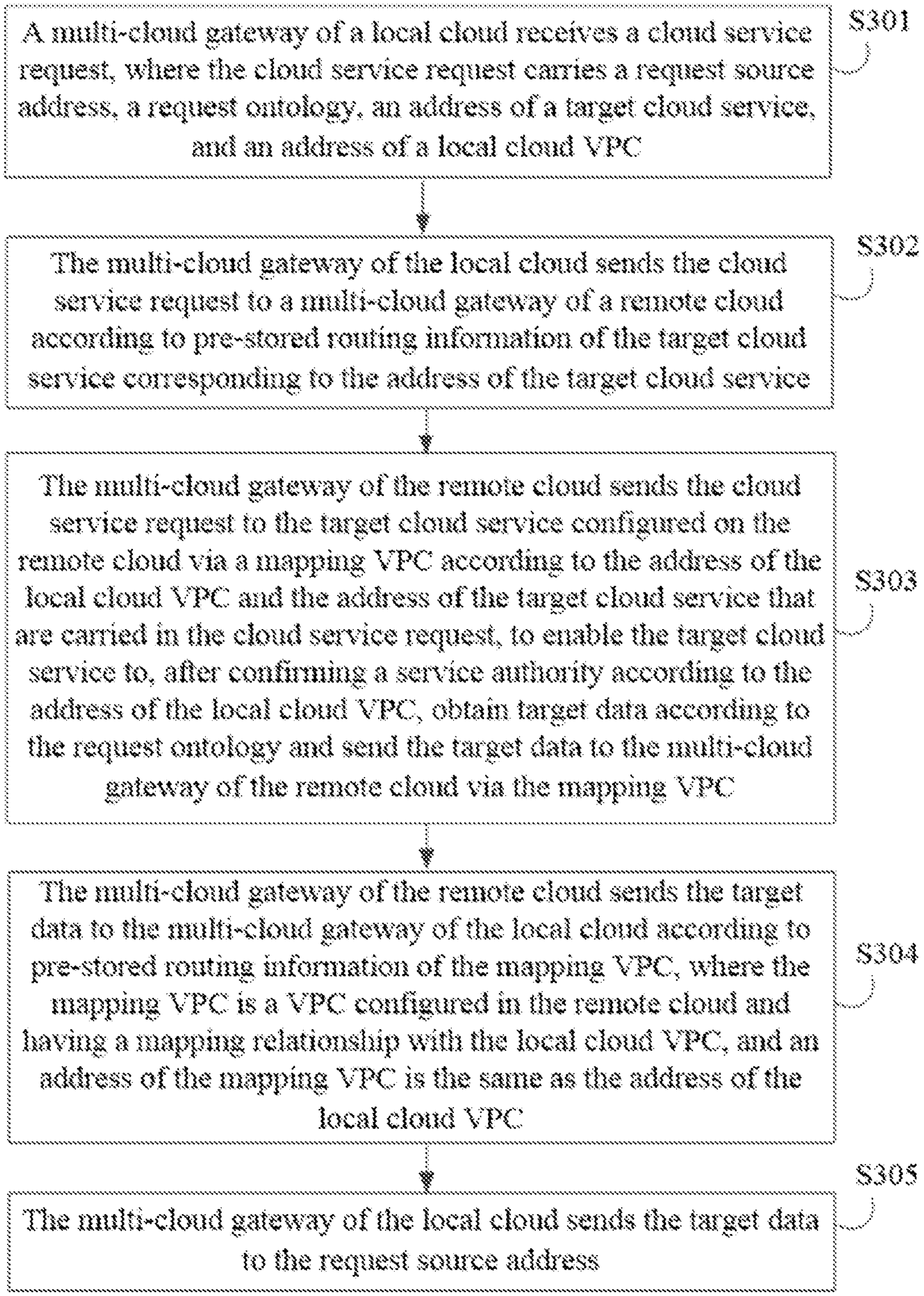
FIG. 3 shows a flowchart of a cloud service method according to still another implementation of the present disclosure.

FIG. 3 shows a flowchart of a cloud service method according to still another implementation of the present disclosure. As shown in FIG. 3, the cloud service method includes the following steps S301 to S305:

In step S301, a multi-cloud gateway of a local cloud receives a cloud service request, where the cloud service request carries a request source address, a request ontology, an address of a target cloud service, and an address of a local cloud VPC.

In step S302, the multi-cloud gateway of the local cloud sends the cloud service request to a multi-cloud gateway of a remote cloud according to pre-stored routing information of the target cloud service corresponding to the address of the target cloud service.

In step S303, the multi-cloud gateway of the remote cloud sends the cloud service request to the target cloud service configured on the remote cloud via a mapping VPC according to the address of the local cloud VPC and the address of the target cloud service that are carried in the cloud service request, to enable the target cloud service to, after confirming a service authority according to the address of the local cloud VPC, obtain target data according to the request ontology and send the target data to the multi-cloud gateway of the remote cloud via the mapping VPC.

In step S304, the multi-cloud gateway of the remote cloud sends the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

In step S305, the multi-cloud gateway of the local cloud sends the target data to the request source address.

As mentioned above, with the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

Considering the above problems, in this implementation, a cloud service method is proposed, which realizes data transmission between multiple clouds by means of the configuration of the multi-cloud gateways and the mapping VPC. The technical solution realizes multi-cloud interoperability of service products. Although the service products are deployed and operated on multiple independent clouds, for a user, it is like operating one cloud. Therefore, the technical solution greatly simplifies the network management procedure of cloud services, and it not only is simple to operate and lower in cost, but also can ensure data security.

In an implementation of the present disclosure, the cloud service method is applicable to a cloud system that includes a local cloud and a remote cloud and can perform cloud service processing.

In an implementation of the present disclosure, the local cloud is configured with a multi-cloud controller of the local cloud, and the remote cloud is configured with a multi-cloud controller of the remote cloud. The method can further include the following steps:

- in response to receiving a multi-cloud control registration request sent by the local cloud VPC, the multi-cloud controller of the local cloud sends the multi-cloud control registration request to the multi-cloud controller of the remote cloud, where the multi-cloud control registration request carries the address of the local cloud VPC and routing information of the local cloud VPC;
- the multi-cloud controller of the remote cloud creates the mapping VPC of the local cloud VPC according to the multi-cloud control registration request, stores the address and the routing information of the mapping VPC into the multi-cloud gateway of the remote cloud, and sends multi-cloud control registration success information to the multi-cloud controller of the local cloud;
- the multi-cloud controller of the local cloud receives the multi-cloud control registration success information returned by the multi-cloud controller of the remote cloud.

The technical terminologies and technical features shown in FIG. 3 and involved in related implementations are identical or similar to the technical terminologies and technical features shown in FIG. 1 and FIG. 2 and mentioned in related implementations, and the explanations and illustrations of the technical terminologies and technical features shown in FIG. 3 and involved in related implementations can be found in the explanations and illustrations for those shown in FIG. 1 and FIG. 2 and mentioned in related implementations, which will not be repeated here.

Figure 4:
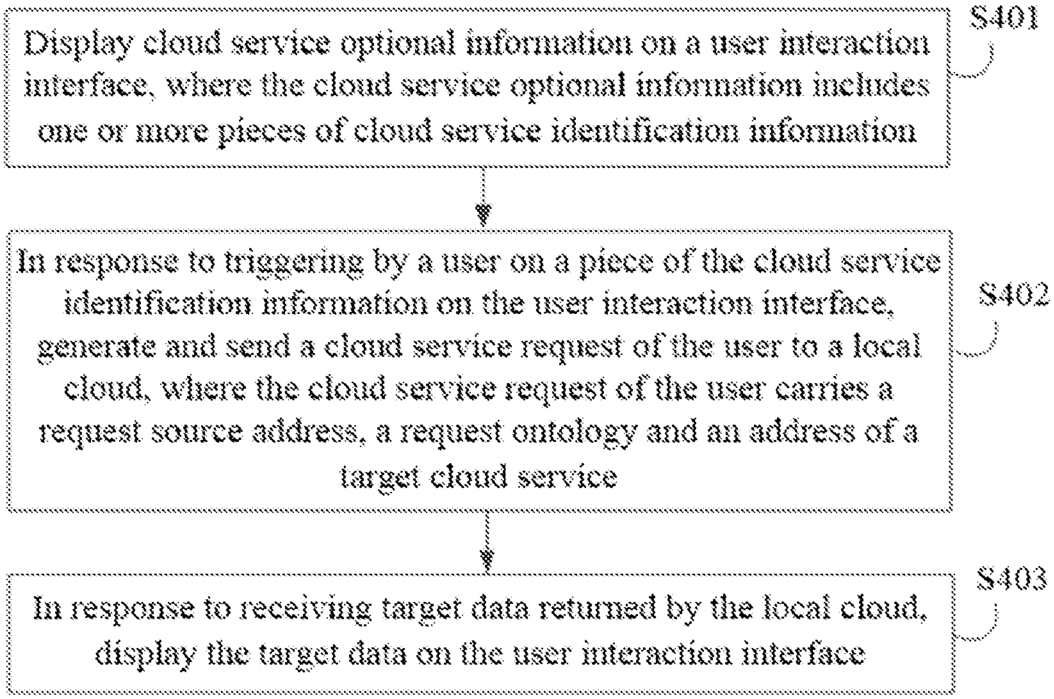
FIG. 4 shows a flowchart of a cloud service method according to yet another implementation of the present disclosure.

FIG. 4 shows a flowchart of a cloud service method according to yet another implementation of the present disclosure. As shown in FIG. 4, the cloud service method includes the following steps S401 to S403.

In step S401, display cloud service optional information on a user interaction interface, where the cloud service optional information includes one or more pieces of cloud service identification information.

In step S402, in response to triggering by a user on a piece of the cloud service identification information on the user interaction interface, generate and send a cloud service request of the user to a local cloud, where the cloud service request of the user carries a request source address, a request ontology and an address of a target cloud service.

In step S403, in response to receiving target data returned by the local cloud, display the target data on the user interaction interface.

In an implementation of the present disclosure, the cloud service method is applicable to a user terminal that can perform cloud service requesting.

In an implementation of the present disclosure, the cloud service optional information refers to information that is displayed in the user interaction interface and provided to the user for selection, and that includes one or more pieces of the cloud service identification information. The cloud service identification information refers to information used to distinctively identify a cloud service, and the cloud service identification information may be, for example, a cloud service name, a cloud service ID, etc.

The technical terminologies and technical features shown in FIG. 4 and involved in related implementations are identical or similar to the technical terminologies and technical features shown in FIG. 1 and FIG. 3 and mentioned in related implementations, and the explanations and illustrations of the technical terminologies and technical features shown in FIG. 4 and involved in related implementations can be found in the explanations and illustrations for those shown in FIG. 1 and FIG. 3 and mentioned in related implementations, which will not be repeated here.

Figure 5:
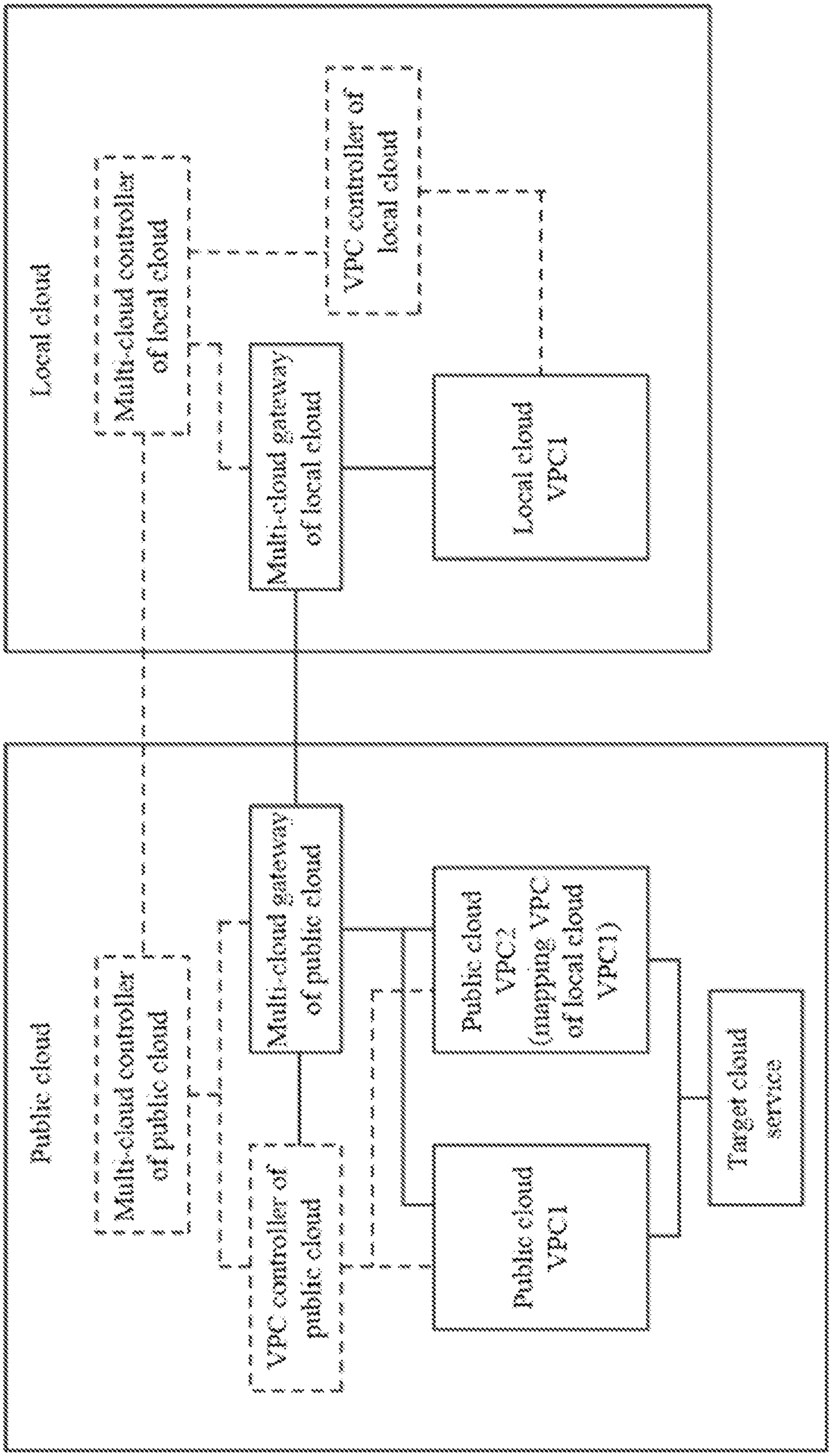
FIG. 5 shows a diagram of an application scenario of a cloud service method according to an implementation of the present disclosure.

FIG. 5 shows a diagram of an application scenario of a cloud service method according to an implementation of the present disclosure. In the scenario, the remote cloud is a public cloud. As shown in FIG. 5, a multi-cloud controller of the local cloud, a multi-cloud gateway of the local cloud, a VPC controller of the local cloud and a VPC (local cloud VPC1) are configured in the local cloud. A multi-cloud controller of the public cloud, a multi-cloud gateway of the public cloud, a VPC controller of the public cloud and two VPCs (public cloud VPC1 and a mapping VPC (public cloud VPC2) having a mapping relationship with the local cloud VPC1) are configured in the public cloud. The mapping VPC has the same address as the address of the local cloud VPC. In FIG. 5, the dotted line represents a control flow, and the solid line represents a data or service transmission flow. First, in response to receiving, through the VPC controller of the local cloud, a multi-cloud control registration request that carries an address of the local cloud VPC1 and routing information of the local cloud VPC1 and that is sent by the local cloud VPC1, the multi-cloud controller of the local cloud sends the multi-cloud control registration request to the multi-cloud controller of the public cloud. The multi-cloud controller of the public cloud creates the mapping VPC of the local cloud VPC1 through the VPC controller of the public cloud according to the multi-cloud control registration request, stores the address and routing information of the mapping VPC into the multi-cloud gateway of the public cloud, and sends multi-cloud control registration success information to the multi-cloud controller of the local cloud. At this point, a data connection channel between the public cloud and the local cloud is established successfully. After receiving the cloud service request carrying the request source address, the request ontology, the address of the target cloud service and the address of the local cloud VPC, the multi-cloud gateway of the local cloud sends the cloud service request to the multi-cloud gateway of the public cloud according to pre-stored routing information of the target cloud service corresponding to the address of the target cloud service. The multi-cloud gateway of the public cloud sends the cloud service request to the target cloud service configured on the public cloud via the mapping VPC whose address is the same as the address of the local cloud VPC according to the address of the local cloud VPC and the address of the target cloud service that are carried in the cloud service request, so as to enable the target cloud service to, after confirming a service authority according to the address of the local cloud VPC, obtain target data according to the request ontology and send the target data to the multi-cloud gateway of the public cloud via the mapping VPC. The multi-cloud gateway of the public cloud sends the target data to the multi-cloud gateway of the local cloud according to the pre-stored routing information of the mapping VPC. The multi-cloud gateway of the local cloud sends the target data to the request source address.

The following are apparatus embodiments of the present disclosure, which can be configured to perform the method embodiments of the present disclosure.

Figure 6:
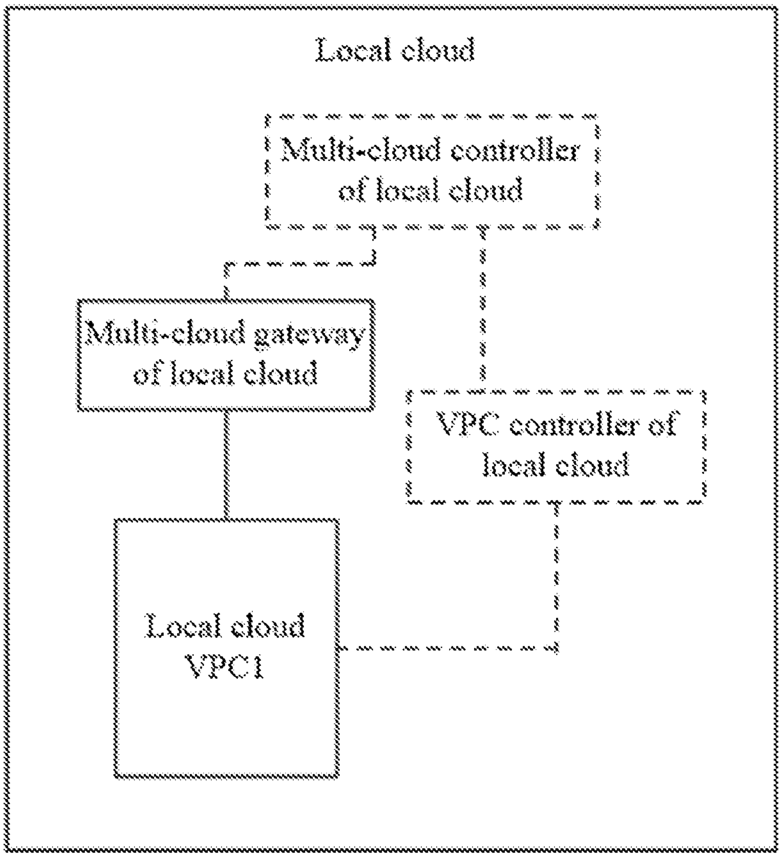
FIG. 6 shows a structural block diagram of a cloud service apparatus according to an implementation of the present disclosure.

FIG. 6 shows a structural block diagram of a cloud service apparatus according to an implementation of the present disclosure. The apparatus can be implemented as part or all of an electronic device through software, hardware, or a combination thereof. As shown in FIG. 6, the cloud service apparatus is applicable to a local cloud configured with a multi-cloud gateway, and the multi-cloud gateway of the local cloud is configured to:

- receive a cloud service request, where the cloud service request carries a request source address, a request ontology, an address of a target cloud service, and an address of a local cloud VPC;
- send the cloud service request to a multi-cloud gateway of a remote cloud according to pre-stored routing information of the target cloud service corresponding to the address of the target cloud service, to enable the multi-cloud gateway of the remote cloud to send the cloud service request to the target cloud service configured on the remote cloud via a mapping VPC according to the address of the local cloud VPC and the address of the target cloud service, and to send target data returned by the target cloud service to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC;
- receive the target data sent by the multi-cloud gateway of the remote cloud, and send the target data to the request source address.

As mentioned above, with the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

Considering the above problems, in this implementation, a cloud service apparatus is proposed, which realizes data transmission between multiple clouds by means of the configuration of the multi-cloud gateways and the mapping VPC. The technical solution realizes multi-cloud interoperability of service products. Although the service products are deployed and operated on multiple independent clouds, for a user, it is like operating one cloud. Therefore, the technical solution greatly simplifies the network management procedure of cloud services, and it not only is simple to operate and lower in cost, but also can ensure data security.

In an implementation of the present disclosure, the cloud service apparatus can be implemented as a local cloud that is configured with a multi-cloud gateway and can perform cloud service processing.

In an implementation of the present disclosure, the local cloud refers to a certain user's proprietary cloud that provides cloud services only for this user.

In an implementation of the present disclosure, the remote cloud refers to a cloud that is different from a proprietary cloud providing cloud services only for a certain user and is not exclusive to the user, and that can provide cloud services for multiple users or belongs to other users. The remote cloud may be, for example, a public cloud, other proprietary clouds, etc. That is to say, the cloud service method can be implemented in the same type of clouds or in different types of clouds.

In an implementation of the present disclosure, the multi-cloud gateway of the local cloud refers to a gateway component configured on the local cloud for realizing multi-cloud data transmission and providing a data transmission channel for multi-cloud services. In order to realize data transmission between the local cloud and the remote cloud, the multi-cloud gateway of the local cloud is configured with the routing information of the target cloud service that the user desires to request. In this way, the multi-cloud gateway of the local cloud can forward the request for the target cloud service to a server of the target cloud service according to the pre-stored routing information of the target cloud service when receiving the request for the target cloud service.

In an implementation of the present disclosure, the cloud service request refers to a request that desires to request a cloud service configured in the remote cloud, and the cloud service request can carry the following information: the request source address, the request ontology, the address of the target cloud service, and the address of the local cloud VPC. The request source address refers to an address of a user who requests the cloud service, that is, an address at which data of the cloud service is received after the data of the cloud service is obtained. The request ontology is used to characterize a specific content of the cloud service request, such as requesting to obtain some data, requesting to obtain some services, etc. The address of the target cloud service refers to an address of a cloud server that provides the user with the data he/she desires. The cloud service is configured in the remote cloud, and the cloud service configured in the remote cloud may belong to the same service provider or different service providers. The address of the local cloud VPC refers to an address of a VPC configured on the local cloud.

In the implementations mentioned above, after receiving the cloud service request carrying the request source address, the request ontology, the address of the target cloud service and the address of the local cloud VPC, the multi-cloud gateway of the local cloud determines the pre-stored routing information of the target cloud service corresponding to the address of the target cloud service, and then sends the cloud service request to the multi-cloud gateway of the remote cloud according to the determined routing information of the target cloud service, so as to enable the multi-cloud gateway of the remote cloud to send the cloud service request to the target cloud service configured on the remote cloud via the mapping VPC according to the address of the local cloud VPC and the address of the target cloud service, and to send the target data returned by the target cloud service to the multi-cloud gateway of the local cloud according to the routing information of the mapping VPC pre-stored by the multi-cloud gateway of the remote cloud, where the mapping VPC is a VPC configured in the remote cloud and having a mapping relationship with the local cloud VPC. The mapping VPC is only a virtual configuration of the local cloud VPC, and it only has the same address as the address of the local cloud VPC, but does not have computing resources of the local cloud VPC. The configuration of the mapping VPC is used to realize data intercommunication between the multi-cloud gateway of the local cloud and the multi-cloud gateway of the remote cloud. Finally, after receiving the target data returned by the multi-cloud gateway of the remote cloud, the multi-cloud gateway of the local cloud can send the target data to the request source address to realize the multi-cloud service provided for the user.

In an implementation of the present disclosure, the local cloud is further configured with a multi-cloud controller, and the multi-cloud controller of the local cloud is configured to:

request a multi-cloud controller of the remote cloud to perform multi-cloud control registration.

In order to establish a data connection channel between the local cloud and the remote cloud, the local cloud is further configured with the multi-cloud controller to realize multi-cloud control registration of the remote cloud. After the multi-cloud control registration is successful, the inter-cloud data transmission described above can be achieved.

In an implementation of the present disclosure, a part for requesting the multi-cloud controller of the remote cloud to perform multi-cloud control registration can be configured to:

in response to receiving a multi-cloud control registration request sent by the local cloud VPC, send the multi-cloud control registration request to the multi-cloud controller of the remote cloud, so as to enable the multi-cloud controller of the remote cloud to create the mapping VPC of the local cloud VPC according to the multi-cloud control registration request, and to store the routing information of the mapping VPC into the multi-cloud gateway of the remote cloud, where the multi-cloud control registration request carries the address of the local cloud VPC and routing information of the local cloud VPC;

receive multi-cloud control registration success information returned by the multi-cloud controller of the remote cloud.

When performing the multi-cloud control registration, the local cloud VPC can send the multi-cloud control registration request to the multi-cloud controller of the local cloud through a VPC controller of the local cloud, where the multi-cloud control registration request carries the address of the local cloud VPC and the routing information of the local cloud VPC. After receiving the multi-cloud control registration request, the multi-cloud controller of the local cloud sends the multi-cloud control registration request to the multi-cloud controller of the remote cloud, so as to enable the multi-cloud controller of the remote cloud to create the mapping VPC of the local cloud VPC through a VPC controller of a public cloud according to the address of the local cloud VPC carried in the multi-cloud control registration request, and to store the routing information of the local cloud VPC into the multi-cloud gateway of the remote cloud as the routing information of the mapping VPC. After receiving the multi-cloud control registration success information returned by the multi-cloud controller of the remote cloud, the multi-cloud controller of the local cloud can deem that the multi-cloud control registration is successful, that is, the data connection channel between the local cloud and remote cloud has been established successfully, and the inter-cloud data transmission mentioned above can be realized by means of the data connection channel between the local cloud and the remote cloud subsequently.

Figure 7:
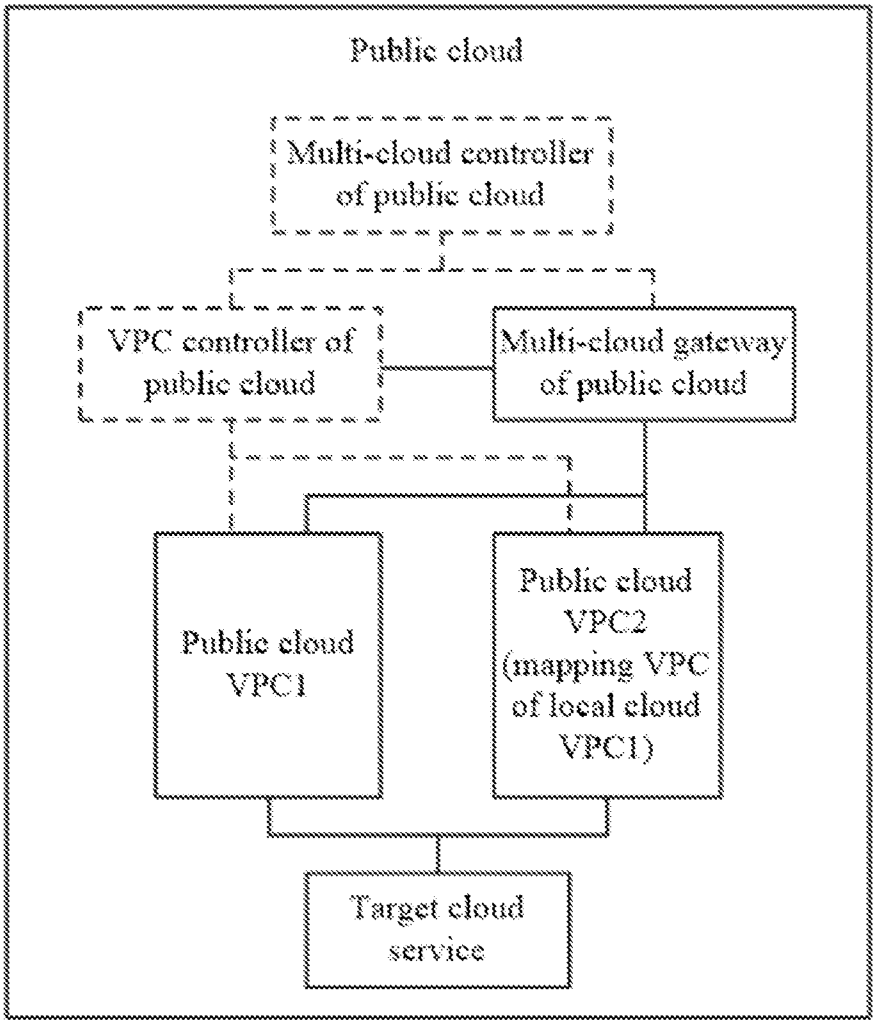
FIG. 7 shows a structural block diagram of a cloud service apparatus according to another implementation of the present disclosure.

FIG. 7 shows a structural block diagram of a cloud service apparatus according to another implementation of the present disclosure. The apparatus can be implemented as part or all of an electronic device through software, hardware, or a combination thereof. As shown in FIG. 7, the cloud service apparatus is applicable to a remote cloud configured with a multi-cloud gateway, and the multi-cloud gateway of the remote cloud is configured to:

receive a cloud service request sent by a multi-cloud gateway of a local cloud, where the cloud service request carries a request source address, a request ontology, an address of a target cloud service, and an address of a local cloud VPC;

send the cloud service request to the target cloud service configured on the remote cloud via a mapping VPC according to the address of the local cloud VPC and the address of the target cloud service, to enable the target cloud service to, after confirming a service authority according to the address of the local cloud VPC, obtain target data according to the request ontology and send the target data to the multi-cloud gateway of the remote cloud via the mapping VPC;

receive the target data sent by the target cloud service, and send the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

As mentioned above, with the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

Considering the above problems, in this implementation, a cloud service apparatus is proposed, which realizes data transmission between multiple clouds by means of the configuration of the multi-cloud gateways and the mapping VPC. The technical solution realizes multi-cloud interoperability of service products. Although the service products are deployed and operated on multiple independent clouds, for a user, it is like operating one cloud. Therefore, the technical solution greatly simplifies the network management procedure of cloud services, and it not only is simple to operate and lower in cost, but also can ensure data security.

In an implementation of the present disclosure, the cloud service apparatus can be implemented as a remote cloud that is configured with a multi-cloud gateway and can perform cloud service processing.

In an implementation of the present disclosure, the multi-cloud gateway of the remote cloud refers to a gateway component configured on the remote cloud for realizing multi-cloud data transmission and providing a data transmission channel for multi-cloud services. In order to realize data transmission between the remote cloud and a user's local cloud, the multi-cloud gateway of the remote cloud is configured with the address and routing information of the mapping VPC of the local cloud VPC. In this way, after receiving the target data sent by the target cloud service, the multi-cloud gateway of the remote cloud can forward the target data to the multi-cloud gateway of the local cloud corresponding to the routing information of the mapping VPC according to the pre-stored address and routing information of the mapping VPC.

In the implementations mentioned above, after receiving the cloud service request that carries the request source address, the request ontology, the address of the target cloud service and the address of the local cloud VPC and that is sent by the multi-cloud gateway of the local cloud, the multi-cloud gateway of the remote cloud forwards the cloud service request to the target cloud service configured on the remote cloud via the mapping VPC according to the address of the local cloud VPC and the address of the target cloud service in the cloud service request, so as to enable the target cloud service to, after confirming the service authority of the user according to the address of the local cloud VPC, obtain the target data that the user desires to request according to the request ontology and send the target data to the multi-cloud gateway of the remote cloud via the mapping VPC. If the user has the authority to use the target cloud service, the address of the local cloud VPC of the user is stored in the target cloud service; if the user does not have the authority to use the target cloud service, the address of the local cloud VPC of the user is not stored in the target cloud service. Therefore, the target cloud service can confirm whether the user has the authority to use the cloud service by confirming whether it stores the address of the local cloud VPC carried in the cloud service request. After receiving the target data sent by the target cloud service, the multi-cloud gateway of the remote cloud can send the target data to the multi-cloud gateway of the local cloud corresponding to the routing information of the mapping VPC according to the pre-stored routing information of the mapping VPC whose address is the same as the address of the local cloud VPC.

In an implementation of the present disclosure, the remote cloud is further configured with a multi-cloud controller, and the multi-cloud controller of the remote cloud is configured to:

perform multi-cloud control registration according to a request from a multi-cloud controller of the local cloud.

In order to establish a data connection channel between the remote cloud and the local cloud, the remote cloud is also configured with the multi-cloud controller to implement multi-cloud control registration for the local cloud. After the multi-cloud control registration is successful, the inter-cloud data transmission described above can be achieved.

In an implementation of the present disclosure, a part for performing multi-cloud control registration according to the request from the multi-cloud controller of the local cloud can be configured to:

in response to receiving a multi-cloud control registration request sent by the multi-cloud controller of the local cloud, create the mapping VPC of the local cloud VPC according to the multi-cloud control registration request, and store the address and the routing information of the mapping VPC into the multi-cloud gateway of the remote cloud, where the multi-cloud control registration request carries the address of the local cloud VPC and routing information of the local cloud VPC;

send multi-cloud control registration success information to the multi-cloud controller of the local cloud.

When performing multi-cloud control registration for the local cloud, after receiving the multi-cloud control registration request that carries the address of the local cloud VPC and the routing information of the local cloud VPC and that is sent by the multi-cloud controller of the local cloud, the multi-cloud controller of the remote cloud creates the mapping VPC of the local cloud VPC through a VPC controller of the remote cloud according to the address of the local cloud VPC carried in the multi-cloud control registration request, and stores the address of the local cloud VPC and the routing information of the local cloud VPC into the multi-cloud gateway of the remote cloud as the address of the mapping VPC and the routing information of the mapping VPC. In this way, the multi-cloud gateway of the remote cloud can subsequently confirm the routing information of the mapping VPC based on the address of the mapping VPC, and send the received data to the multi-cloud gateway of the local cloud corresponding to the local cloud VPC according to the routing information of the mapping VPC.

Then the multi-cloud control registration success information can be sent to the multi-cloud controller of the local cloud to confirm that the multi-cloud control registration is successful, that is, to confirm that the data connection channel between the remote cloud and the local cloud is established successfully, and then the inter-cloud data transmission described above can be realized by means of the data connection channel between the remote cloud and the local cloud.

The technical terminologies and technical features shown in FIG. 7 and involved in related implementations are identical or similar to the technical terminologies and technical features shown in FIG. 6 and mentioned in related implementations, and the explanations and illustrations of the technical terminologies and technical features shown in FIG. 7 and involved in related implementations can be found in the explanations and illustrations for those shown in FIG. 6 and mentioned in related implementations, which will not be repeated here.

A cloud service system including a local cloud and a remote cloud according to yet another implementation of the present disclosure is shown in FIG. 5. The cloud service system includes:

- a multi-cloud gateway of the local cloud, configured to: receive a cloud service request, where the cloud service request carries a request source address, a request ontology, an address of a target cloud service, and an address of a local cloud VPC; send the cloud service request to a multi-cloud gateway of a remote cloud according to pre-stored routing information of the target cloud service corresponding to the address of the target cloud service; send the received target data to the request source address;
- a multi-cloud gateway of the remote cloud, configured to: send the cloud service request to the target cloud service configured on the remote cloud via a mapping VPC according to the address of the local cloud VPC and the address of the target cloud service that are carried in the cloud service request, to enable the target cloud service to, after confirming a service authority according to the address of the local cloud VPC, obtain target data according to the request ontology and send the target data to the multi-cloud gateway of the remote cloud via the mapping VPC; send the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

As mentioned above, with the development of cloud computing technologies, many users use data and services provided by clouds. In order to ensure the security of data use, many users apply for proprietary clouds, which can also be called local clouds. However, service products configured on a public cloud are relatively rich and developing rapidly. These service products can be provided for use by the users of the proprietary clouds. Therefore, in many cases, a user needs to use the local cloud and the public cloud simultaneously. In the prior art, there are two processing ways: first, deploy the service products in the public cloud into the proprietary cloud or other clouds of the user; second, connect the public cloud with the proprietary cloud through a network and configure a network connection strategy. The first processing way requires higher costs and has a longer period, while the second processing way is more complex and has higher data security risks. Therefore, there is an urgent need for a multi-cloud service solution that is simple to operate, and has lower costs and lower data security risks.

Considering the above problems, in this implementation, a cloud service system is proposed, which realizes data transmission between multiple clouds by means of the configuration of the multi-cloud gateways and the mapping VPC. The technical solution realizes multi-cloud interoperability of service products. Although the service products are deployed and operated on multiple independent clouds, for a user, it is like operating one cloud. Therefore, the technical solution greatly simplifies the network management procedure of cloud services, and it not only is simple to operate and lower in cost, but also can ensure data security.

In an implementation of the present disclosure, the cloud service system is applicable to a cloud system that includes a local cloud and a remote cloud and can perform cloud service processing.

In an implementation of the present disclosure, the local cloud is configured with a multi-cloud controller of the local cloud, and remote cloud is configured with a multi-cloud controller of the remote cloud.

The multi-cloud controller of the local cloud is configured to: in response to receiving a multi-cloud control registration request sent by the local cloud VPC, send the multi-cloud control registration request to the multi-cloud controller of the remote cloud; receive multi-cloud control registration success information returned by the multi-cloud controller of the remote cloud, where the multi-cloud control registration request carries the address of the local cloud VPC and routing information of the local cloud VPC.

The multi-cloud controller of the remote cloud is configured to: create the mapping VPC of the local cloud VPC according to the multi-cloud control registration request, store the address and the routing information of the mapping VPC into the multi-cloud gateway of the remote cloud, and send the multi-cloud control registration success information to the multi-cloud controller of the local cloud.

In an implementation of the present disclosure, a multi-cloud gateway applicable to a local cloud is also disclosed, and the multi-cloud gateway can be configured to:

- receive a cloud service request, where the cloud service request carries a request source address, a request ontology, an address of a target cloud service, and an address of a local cloud VPC;
- send the cloud service request to a multi-cloud gateway of a remote cloud according to pre-stored routing information of the target cloud service corresponding to the address of the target cloud service, to enable the multi-cloud gateway of the remote cloud to send the cloud service request to the target cloud service configured on the remote cloud via a mapping VPC according to the address of the local cloud VPC and the address of the target cloud service, and to send target data returned by the target cloud service to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC;
- receive the target data sent by the multi-cloud gateway of the remote cloud, and send the target data to the request source address.

In an implementation of the present disclosure, a multi-cloud gateway applicable to a remote cloud is also disclosed, and the multi-cloud gateway can be configured to:

- receive a cloud service request sent by a multi-cloud gateway of a local cloud, where the cloud service request carries a request source address, a request ontology, an address of a target cloud service, and an address of a local cloud VPC;
- send the cloud service request to the target cloud service configured on the remote cloud via a mapping VPC according to the address of the local cloud VPC and the address of the target cloud service, to enable the target cloud service to, after confirming a service authority according to the address of the local cloud VPC, obtain target data according to the request ontology and send the target data to the multi-cloud gateway of the remote cloud via the mapping VPC;

receive the target data sent by the target cloud service, and send the target data to the multi-cloud gateway of the local cloud according to pre-stored routing information of the mapping VPC, where the mapping VPC is a VPC configured in the remote cloud and having a mapping relationship with the local cloud VPC, and an address of the mapping VPC is the same as the address of the local cloud VPC.

Figure 8:
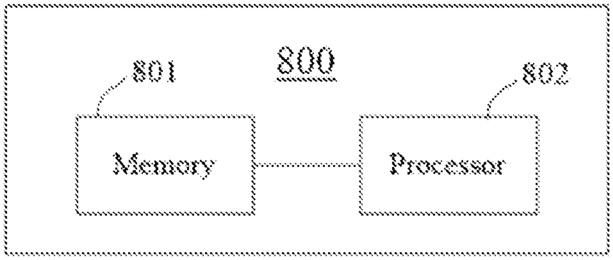
FIG. 8 shows a structural block diagram of an electronic device according to an implementation of the present disclosure.

The present disclosure also discloses an electronic device. FIG. 8 shows a structural block diagram of an electronic device according to an implementation of the present disclosure. As shown in FIG. 8, the electronic device 800 includes a memory 801 and a processor 802, where, the memory 801 is configured to store one or more computer instructions, and the one or more computer instructions are executed by the processor 802 to implement the method steps described above.

The electronic device may be an electronic component such as a gateway or may be a server.

Figure 9:
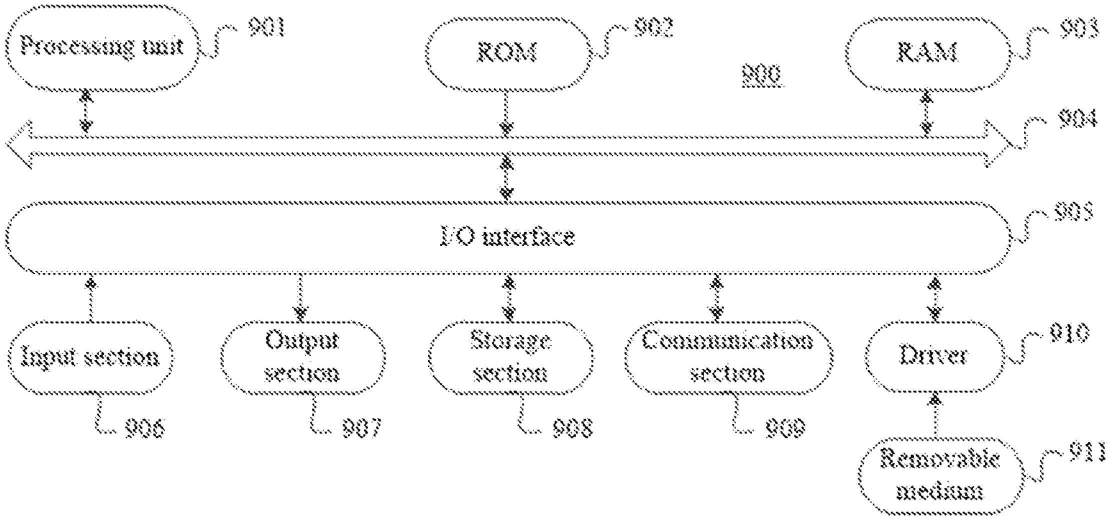
FIG. 9 is a schematic structural diagram of a computer system applicable to implementing a cloud service method according to an implementation of the present disclosure.

FIG. 9 is a schematic structural diagram of a computer system applicable to implementing a cloud service method according to an implementation of the present disclosure.

As shown in FIG. 9, the computer system 900 includes a processing unit 901 that can perform various processing in the implementations described above according to a program stored in a read-only memory (ROM) 902 or loaded from a storage portion 908 into a random access memory (RAM) 903. In the RAM 903, various programs and data required for the operation of the system 900 are further stored. The processing unit 901, the ROM 902 and the RAM 903 are connected to each other through a bus 904. An input/output (I/O) interface 905 is also connected to the bus 904.

The following components are connected to the I/O interface 905: an input section 906 including a keyboard, a mouse, etc.; an output section 907 including a cathode ray tube (CRT), a liquid crystal display (LCD), a speaker, etc.; the storage section 908 including a hard disk and/or the like; and a communication section 909 including a network interface card such as a local area network (LAN) card, a modem, etc. The communication section 909 performs communication processing via a network such as the Internet. A driver 910 is also connected to the I/O interface 905 as needed. A removable medium 911, such as a magnetic disk, an optical disk, a magneto-optical disk, a semiconductor memory and/or the like, are installed on the driver 910 as needed so that a computer program read from the removable medium 911 is installed into the storage section 908 as needed. The processing unit 901 may be implemented as a processing unit such as a central processing unit (CPU), a graphic processing unit (GPU), a tensor processing unit (TPU), a field programmable gate array (FPGA), a network processing unit (NPU), etc.

In particular, according to the implementations of the present disclosure, the method described above can be implemented as a computer software program. For example, implementations of the present disclosure include a computer program product including a computer program tangibly embodied on a machine readable medium, and the computer program includes program codes for executing the cloud service method. In such implementations, the computer program can be downloaded from the network via the communication section 909 and installed, and/or be installed from the removable medium 911.

The flowcharts and block diagrams in the drawings illustrate the architecture, functions and operations of possible implementations of systems, methods, and computer program products according to various embodiments of the present disclosure. In this regard, each block in the flowcharts or block diagrams can represent a module, a program segment, or a part of codes that contain one or more executable instructions for implementing a specified logical function. It should also be noted that in some alternative implementations, a function noted in a block can occur in the order different from that noted in the drawing. For example, two blocks shown one after another can actually be executed substantially in parallel, or they can sometimes be executed in the reverse order, which depends on the functionality involved. It should also be noted that each block of the block diagrams and/or flowcharts, and a combination of blocks in the block diagrams and/or flowcharts, can be implemented by special-purpose hardware-based systems that perform the specified functions or operations or can be implemented using a combination of special-purpose hardware and computer instructions.

The involved units or modules described in the embodiments of the present disclosure can be implemented in software or hardware. The described units or modules can also be provided in a processor, and the names of these units or modules do not constitute limitations on the units or modules themselves in some cases.

As another aspect, an embodiment of the present disclosure also provides a computer-readable storage medium, which can be a computer-readable storage medium included in the apparatus described in the implementations mentioned above, or a computer-readable storage medium that exists alone and is not assembled into a device. The computer-readable storage medium stores therein one or more programs, which are used by one or more processors to execute the methods described in the embodiments of the present disclosure.

The above description is only an illustration of preferred embodiments and the applied technical principles of the present disclosure. Those skilled in the art should understand that the protection scope involved in the embodiments of the present disclosure is not limited to technical solutions formed by specific combinations of the technical features described above, but should also cover other technical solutions formed by any combinations of the technical features or equivalent features thereof without departing from the inventive concept, for example, a technical solution formed by replacing the features described above with (but not limited to) technical features with similar functions disclosed in the embodiments of the present disclosure.

The invention claimed is:

1. A cloud service method applicable to a local cloud configured with a multi-cloud gateway, comprising:

receiving, by the multi-cloud gateway of the local cloud, a cloud service request, wherein the cloud service request carries a request source address, a request ontology, an address of a target cloud service, and an address of a local cloud virtual private cloud (VPC);

sending, by the multi-cloud gateway of the local cloud, the cloud service request to a multi-cloud gateway of a remote cloud according to pre-stored routing information of the target cloud service corresponding to the address of the target cloud service, to enable the multi-cloud gateway of the remote cloud to send the cloud service request to the target cloud service configured on the remote cloud via a mapping VPC according to the address of the local cloud VPC and the address of the target cloud service, and to send target data returned by the target cloud service to the multi-cloud gateway of the local cloud according to pre-stored routing information of the mapping VPC, wherein the mapping VPC is a VPC configured in the remote cloud and having a mapping relationship with the local cloud VPC, and an address of the mapping VPC is the same as the address of the local cloud VPC; and receiving, by the multi-cloud gateway of the local cloud, the target data sent by the multi-cloud gateway of the remote cloud, and sending the target data to the request source address, wherein the local cloud is further configured with a multi-cloud controller, and the cloud service method further comprises:

requesting, by the multi-cloud controller of the local cloud, a multi-cloud controller of the remote cloud to perform multi-cloud control registration, and wherein the requesting, by the multi-cloud controller of the local cloud, the multi-cloud controller of the remote cloud to perform multi-cloud control registration comprises:

in response to receiving a multi-cloud control registration request sent by the local cloud VPC, sending, by the multi-cloud controller of the local cloud, the multi-cloud control registration request to the multi-cloud controller of the remote cloud, to enable the multi-cloud controller of the remote cloud to create the mapping VPC of the local cloud VPC according to the multi-cloud control registration request, and to store the routing information of the mapping VPC into the multi-cloud gateway of the remote cloud, wherein the multi-cloud control registration request carries the address of the local cloud VPC and routing information of the local cloud VPC; and receiving, by the multi-cloud controller of the local cloud, multi-cloud control registration success information returned by the multi-cloud controller of the remote cloud.

2. A cloud service method applicable to a remote cloud configured with a multi-cloud gateway, comprising:

receiving, by the multi-cloud gateway of the remote cloud, a cloud service request sent by a multi-cloud gateway of a local cloud, wherein the cloud service request carries a request source address, a request ontology, an address of a target cloud service, and an address of a local cloud virtual private cloud (VPC);

sending, by the multi-cloud gateway of the remote cloud, the cloud service request to the target cloud service configured on the remote cloud via a mapping VPC according to the address of the local cloud VPC and the address of the target cloud service, to enable the target cloud service to, after confirming a service authority according to the address of the local cloud VPC, obtain target data according to the request ontology and send the target data to the multi-cloud gateway of the remote cloud via the mapping VPC; and receiving, by the multi-cloud gateway of the remote cloud, the target data sent by the target cloud service, and sending the target data to the multi-cloud gateway of the local cloud according to pre-stored routing information of the mapping VPC, wherein the mapping VPC is a VPC configured in the remote cloud and having a mapping relationship with the local cloud VPC, and an address of the mapping VPC is the same as the address of the local cloud VPC, wherein the remote cloud is further configured with a multi-cloud controller, and the cloud service method further comprises:

performing, by the multi-cloud controller of the remote cloud, multi-cloud control registration according to a request from a multi-cloud controller of the local cloud, and wherein the performing, by the multi-cloud controller of the remote cloud, multi-cloud control registration according to the request from the multi-cloud controller of the local cloud comprises:

in response to receiving a multi-cloud control registration request sent by the multi-cloud controller of the local cloud, creating, by the multi-cloud controller of the remote cloud, the mapping VPC of the local cloud VPC according to the multi-cloud control registration request, and storing the address and the routing information of the mapping VPC into the multi-cloud gateway of the remote cloud, wherein the multi-cloud control registration request carries the address of the local cloud VPC and routing information of the local cloud VPC; and sending, by the multi-cloud controller of the remote cloud, multi-cloud control registration success information to the multi-cloud controller of the local cloud.

3. A cloud service method applicable to a cloud system comprising a local cloud and a remote cloud, comprising:

receiving, by a multi-cloud gateway of the local cloud, a cloud service request, wherein the cloud service request carries a request source address, a request ontology, an address of a target cloud service, and an address of a local cloud virtual private cloud (VPC);

sending, by the multi-cloud gateway of the local cloud, the cloud service request to a multi-cloud gateway of the remote cloud according to pre-stored routing information of the target cloud service corresponding to the address of the target cloud service;

sending, by the multi-cloud gateway of the remote cloud, the cloud service request to the target cloud service configured on the remote cloud via a mapping VPC according to the address of the local cloud VPC and the address of the target cloud service that are carried in the cloud service request, to enable the target cloud service to, after confirming a service authority according to the address of the local cloud VPC, obtain target data according to the request ontology and send the target data to the multi-cloud gateway of the remote cloud via the mapping VPC;

sending, by the multi-cloud gateway of the remote cloud, the target data to the multi-cloud gateway of the local cloud according to pre-stored routing information of the mapping VPC, wherein the mapping VPC is a VPC configured in the remote cloud and having a mapping relationship with the local cloud VPC, and an address of the mapping VPC is the same as the address of the local cloud VPC; and sending, by the multi-cloud gateway of the local cloud, the target data to the request source address, wherein the local cloud is configured with a multi-cloud controller of the local cloud, the remote cloud is configured with a multi-cloud controller of the remote cloud, and the cloud service method further comprises:

in response to receiving a multi-cloud control registration request sent by the local cloud VPC, sending, by the multi-cloud controller of the local cloud, the multi-cloud control registration request to the multi-cloud controller of the remote cloud, wherein the multi-cloud control registration request carries the address of the local cloud VPC and routing information of the local cloud VPC;

creating, by the multi-cloud controller of the remote cloud, the mapping VPC of the local cloud VPC according to the multi-cloud control registration request, storing the address and the routing information of the mapping VPC into the multi-cloud gateway of the remote cloud, and sending multi-cloud control registration success information to the multi-cloud controller of the local cloud; and receiving, by the multi-cloud controller of the local cloud, the multi-cloud control registration success information returned by the multi-cloud controller of the remote cloud.

4. An electronic device, comprising a memory and a processor; wherein, the memory is configured to store one or more computer instructions, and the one or more computer instructions are executed by the processor to implement the cloud service method according to claim 1.

5. The electronic device according to claim 4, wherein the one or more computer instructions are executed by the processor to further enable the processor to:

request a multi-cloud controller of the remote cloud to perform multi-cloud control registration.

6. The electronic device according to claim 5, wherein the one or more computer instructions are executed by the processor to further enable the processor to:

in response to receiving a multi-cloud control registration request sent by the local cloud VPC, send the multi-cloud control registration request to the multi-cloud controller of the remote cloud, to enable the multi-cloud controller of the remote cloud to create the mapping VPC of the local cloud VPC according to the multi-cloud control registration request, and to store the routing information of the mapping VPC into the multi-cloud gateway of the remote cloud, wherein the multi-cloud control registration request carries the address of the local cloud VPC and routing information of the local cloud VPC; and receive multi-cloud control registration success information returned by the multi-cloud controller of the remote cloud.

7. A non-transitory computer-readable storage medium, having computer instructions stored thereon, wherein the cloud service method according to claim 1 is implemented when the computer instructions are executed by a processor.

8. The non-transitory computer-readable storage medium according to claim 7, wherein the computer instructions are executed by the processor to further enable the processor to:

request a multi-cloud controller of the remote cloud to perform multi-cloud control registration.

9. The non-transitory computer-readable storage medium according to claim 8, wherein the computer instructions are executed by the processor to further enable the processor to:

in response to receiving a multi-cloud control registration request sent by the local cloud VPC, send the multi-cloud control registration request to the multi-cloud controller of the remote cloud, to enable the multi-cloud controller of the remote cloud to create the mapping VPC of the local cloud VPC according to the multi-cloud control registration request, and to store the routing information of the mapping VPC into the multi-cloud gateway of the remote cloud, wherein the multi-cloud control registration request carries the address of the local cloud VPC and routing information of the local cloud VPC; and receive multi-cloud control registration success information returned by the multi-cloud controller of the remote cloud.

10. An electronic device, comprising a memory and a processor; wherein, the memory is configured to store one or more computer instructions, and the one or more computer instructions are executed by the processor to implement the cloud service method according to claim 2.

11. The electronic device according to claim 10, wherein the one or more computer instructions are executed by the processor to further enable the processor to:

perform multi-cloud control registration according to a request from a multi-cloud controller of the local cloud.

12. The electronic device according to claim 11, wherein the one or more computer instructions are executed by the processor to further enable the processor to:

in response to receiving a multi-cloud control registration request sent by the multi-cloud controller of the local cloud, create the mapping VPC of the local cloud VPC according to the multi-cloud control registration request, and store the address and the routing information of the mapping VPC into the multi-cloud gateway of the remote cloud, wherein the multi-cloud control registration request carries the address of the local cloud VPC and routing information of the local cloud VPC; and send multi-cloud control registration success information to the multi-cloud controller of the local cloud.

13. A non-transitory computer-readable storage medium, having computer instructions stored thereon, wherein the cloud service method according to claim 2 is implemented when the computer instructions are executed by a processor.

14. The non-transitory computer-readable storage medium according to claim 13, wherein the computer instructions are executed by the processor to further enable the processor to:

in response to receiving a multi-cloud control registration request sent by a multi-cloud controller of the local cloud, create the mapping VPC of the local cloud VPC according to the multi-cloud control registration request, and store the address and the routing information of the mapping VPC into the multi-cloud gateway of the remote cloud, wherein the multi-cloud control registration request carries the address of the local cloud VPC and routing information of the local cloud VPC; and send multi-cloud control registration success information to the multi-cloud controller of the local cloud.

15. A cloud system comprising a local cloud and a remote cloud, wherein the cloud system is configured to implement the cloud service method according to claim 3.

* * * * *